United States Patent [19]

Murray, Jr.

[11] Patent Number: 5,077,905
[45] Date of Patent: Jan. 7, 1992

[54] LASER ALIGNMENT MOUNT ASSEMBLY AND METHOD

[76] Inventor: Malcolm G. Murray, Jr., 220 E. Texas Ave., Baytown, Tex. 77520

[21] Appl. No.: 532,879

[22] Filed: Jun. 4, 1990

[51] Int. Cl.$^5$ ............................................. G01B 5/25
[52] U.S. Cl. ........................................ 33/412; 33/645; 33/DIG. 21; 374/55; 356/400
[58] Field of Search ............... 374/55, 56; 33/412, 33/286, 645, 655, DIG. 21; 356/399, 340, 141, 152, 400

[56] References Cited

U.S. PATENT DOCUMENTS

| | | | |
|---|---|---|---|
| 3,750,299 | 8/1973 | Plasser et al. | 33/DIG. 21 |
| 3,865,491 | 2/1975 | Hogan | 356/141 |
| 4,035,084 | 7/1977 | Ramsay | 356/400 |
| 4,102,052 | 7/1978 | Bloch | 33/412 |
| 4,231,161 | 11/1980 | Belfiore | 33/655 |
| 4,413,907 | 11/1983 | Lane | 356/141 |
| 4,441,812 | 4/1984 | Feist | 33/228 |
| 4,518,855 | 5/1985 | Malak | 356/400 |
| 4,698,491 | 10/1987 | Lysen | 356/400 |
| 4,709,485 | 12/1987 | Bowman | 33/286 |
| 4,845,856 | 6/1989 | Rochette | 33/228 |
| 4,888,890 | 12/1989 | Studebaker et al. | 33/DIG. 21 |
| 4,928,401 | 5/1990 | Murray, Jr. | 33/412 |

FOREIGN PATENT DOCUMENTS

8701439  3/1987  World Int. Prop. O. ............. 33/412

*Primary Examiner*—Allan N. Shoap
*Assistant Examiner*—Diego F. F. Gutierrez
*Attorney, Agent, or Firm*—King and Schickli

[57] ABSTRACT

An assembly for providing alignment growth measurements for coupled shafts includes laser alignment measurement equipment and a mounting assembly for attaching the laser alignment measurement equipment to bearing housings of cooperating coupled shafts. The mounting assembly includes a bracket for attaching directly to the bearing housing. A first mounting disk is attached directly to the bracket. A second mounting disk is attached to the first mounting disk and is universally pivotally adjustable about a center pivot ball between the mounting disks. Tilt-adjusting screws are placed at equally spaced quadrantal positions to effect the pivoting of the second mounting disk. A cylindrical insert is attached to the second mounting disk and receives a detachable end cap. The end cap is adapted to receive the laser measuring assembly. Accurate measurement data is provided by a plurality of pairs of cooperating tooling balls. An outside micrometer is used to measure the gap. To gather the information required for determining alignment, the laser equipment is initially zeroed before beginning the thermal cycle and the gaps between cooperating tooling balls measured. Following the end of the thermal cycle, the laser equipment is re-zeroed by pivotally adjusting the mount assembly. The change in gaps between cooperating tooling balls is measured and alignment growth information calculated.

18 Claims, 3 Drawing Sheets

BACK-ZEROING LASER/TARGET SYSTEM GROWTH MEASUREMENT- RAW DATA

Fig. 6A

BACK-ZEROING LASER/TARGET SYSTEM GROWTH MEASUREMENT-CALCULATIONS

Fig. 6B

LASER ALIGNMENT MOUNT ASSEMBLY AND METHOD

TECHNICAL FIELD

The present invention relates generally to alignment systems and more particularly to a mounting system for laser alignment equipment for measuring relative thermal growth between two rotating machine elements flexibly coupled together.

BACKGROUND OF THE INVENTION

The necessity for accurate alignment of coupled rotating shaft machinery is well known. More specifically, in order to assure maximum machinery longevity, accurate alignment between driving and driven components is essential. As is known in the art, if a coupling is set for perfect alignment in the cold or non-running condition, the machinery often drifts away from this orientation as operating temperatures change. This can lead to higher vibration levels, or harmful shaft misalignment, potentially resulting in premature excessive wear, or even in catastrophic failure.

In order to compensate for this occurrence, initial alignment of non-operating coupled shafts often includes an offset to account for relative anticipated thermal expansion or contraction as the machinery reaches full operating conditions. More specifically, the machinery is set out of alignment by a predetermined amount and allowed to grow into true alignment during operation. Often, however, accurate cold alignment offset figures are not available, forcing the field technician to attempt to align the rotating components without any guidelines for compensation. This inherently leads to inaccuracies and thence possibly to premature machine failure. This situation is unacceptable due to the related safety hazard, possible damage to the machine components and the related downtime.

A variety of shaft alignment/thermal growth measurement systems have attempted to address this problem. U.S. Pat. No. 4,102,052 to Bloch, discloses an apparatus for determining axial displacement or deflection of a rotating shaft or coupling due to temperature change, thus allowing compensation for shaft axial growth. A calibrated deflection decal is affixed to the coupling spacer tube and zeroed at a convenient point, such as at the guard of a standard diaphragm coupling. The machine is placed into service and axial deflection of the shaft is determined by reading the decal with the aid of speed synchronized stroboscopic light. While the use of this system has proved generally effective, it provides only data of sufficient precision to aid in correcting axial displacement. It does not address the problem of sufficiently correcting parallel and angular misalignment, and as such is only of limited effectiveness.

U.S. Pat. No. 4,428,126 to Banks discloses an apparatus for monitoring shaft alignment utilizing a bar or other mounting means attached to component housings. Eddy current proximity probes are utilized to obtain information that can be converted into shaft alignment change data. Eddy current proximity probes are also used in the system disclosed in U.S. Pat. No. 3,783,522 to Dodd. A more thorough use of such proximity probes is disclosed in U.S. Pat. No. 4,033,042 to Bently and U.S. Pat. No. 4,148,013 to Finn. The proximity probe systems disclosed in these references effectively measure running angular and parallel alignment of one machine relative to another to which it is flexibly coupled. These systems use shaft centerline relationships, and provide growth data to be used in calculating misalignment. While this is advantageous from the standpoint of allowing mathematical calculations, the systems are complex, expensive and difficult to retrofit to existing machines.

A different approach is disclosed in the applicant's U.S. Pat. No. 4,928,401, entitled Shaft Alignment System. A system is disclosed whereby vernier scales are attached to a machine coupling, and running alignment measurements are taken with speed synchronized stroboscopic light. The system measures hot or running angular and parallel alignment at the center of the machine shafts. This system incorporates many advantages over the others, but does exhibit limitations as to the types of machines and couplings to which it can be applied. Its use also requires that the machines be shut down prior to scale installation and again for scale removal following completion of measurement. On many machines that run continuously over long periods of time, this is inconvenient or impractical.

Various laser growth measurement and monitoring approaches have also been used. The laser alignment equipment, once properly mounted to adjacent machines, generally provides growth data that is then utilized to determine the appropriate offsets to be applied to the machine elements to bring about improved hot running alignment. U.S. Pat. No. 4,698,491 to Lysen discloses a laser alignment system whose primary purpose is for basic alignment of machine shafts while the machines are shut down. While the reference suggests attaching the laser equipment to the rotating shafts themselves, in most thermal growth measurement applications, somewhat different laser equipment is mounted to machine bearing housings. This advantageously allows continuous monitoring of shaft alignment. It further allows the equipment to be mounted while the coupled machines are running in anticipation of gathering data.

It can be appreciated that laser growth measurement data is preferable when taken from beginning to end of the hot-to-cold thermal cycle. This allows the machine operator to convert the growth data into offset figures and then apply the offsets to the non-running machines prior to start-up. This measurement procedure in usual applications heretofore has required the laser equipment to remain in place undisturbed throughout the cycle, which is difficult to accomplish with delicate instruments. It also becomes expensive if a multiplicity of machines are shut down in the same time frame, each requiring a set of laser equipment to accomplish simultaneous measurement.

A further limitation of this approach is the generally poor linearity of some laser targets over the range of thermal movement or growth encountered. More particularly, while laser equipment generally has excellent repeatability, i.e. bringing the laser beam axis and the laser target axis into substantial alignment (with the laser beam at the target center and perpendicular to the target surface), it has less than ideal linearity characteristics as the beam axis moves further away from target axis, representing some degree of thermal growth. Thus, as growth becomes greater, the prior art laser equipment becomes increasingly inaccurate. There is an inherent difficulty in compensating, calibrating or correcting for this poor linearity, although some systems achieve partial correction by algorithm or electronic means. In extreme cases, the relative movement of machines may cause the laser beam to move beyond the target aperture limits, thus losing the numerical display provided by equipment readouts and making attempted measurement completely unsuccessful.

A need exists, therefore, for a shaft alignment system for measuring thermal growth that incorporates the benefit of laser equipment repeatability while avoiding the drawbacks of its less than ideal linearity and target aperture size limits. Such a system would be simple to install and operate, and provide highly accurate results relating to both angular and parallel misalignment over a wide range of measurement. Further desirable features would include low cost, even with a multiplicity of machines shutting down in the same time frame, and capability of installation during machine operation, thus permitting more desirable hot to cold measurement. This would allow corrective adjustments to be made prior to resumption of machine operation. A further desirable feature would include the capability for easy testing of the system at any time for damage or deterioration, by plugging the components into a previously calibrated test stand assembly.

SUMMARY OF THE INVENTION

Accordingly, it is a primary object of the present invention to provide an assembly and related method for easily mounting and using laser alignment thermal growth measurement equipment.

It is another object of the present invention to provide a laser alignment thermal growth measurement system that improves alignment accuracy by relying on the inherent repeatability of the laser equipment while substantially avoiding potential linearity problems.

It is still another object of the present invention to provide a laser alignment system that substantially increases the measurement range over which the laser equipment provides accurate growth data.

Still another object of the present invention is to provide a laser alignment assembly/method that allows one set of laser alignment equipment to be utilized in measuring thermal growth on a plurality of machines whose relative movement is occurring in the same time frame.

It is another object of the present invention to provide an assembly/method for mounting laser alignment equipment so that the equipment can be selectively installed and removed during a measurement cycle without a significant loss of accuracy.

Another object of the present invention is to provide a system for mounting laser alignment equipment that allows for re-zeroing adjustment that is independently measurable.

It is a further object of the present invention to provide a mount assembly that allows attached laser alignment equipment to be tilt-adjusted about a center fulcrum on a constant diameter.

It is another object of the present invention to provide a laser alignment system and method that allows the laser alignment equipment to gather vertical and horizontal, parallel and angular measurement data from one mounting location.

It is an additional object of the present invention to provide the capability for easy testing of the laser alignment system at any time for damage or deterioration with the use of a calibrated test stand assembly.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved laser alignment system including a novel mount assembly is provided. The mount assembly advantageously allows the laser alignment equipment to be removed following initial zeroing and reinstalled after the thermal growth cycle is complete. This provides the capability of allowing a plurality of machines to be measured during the same time frame with the use of one set of laser equipment. The laser alignment system including the mount assembly takes advantage of the good repeatability of the laser equipment while being substantially independent of the accuracy concerns associated with its less than favorable linearity characteristics of the past.

The improved mount assembly has tooling balls to allow precise measurement of vertical and horizontal tilt about a center fulcrum on a constant diameter following adjustment to the laser zero reference point. The new mount assembly also provides an increased measurement range, enhancing its ability to provide accurate measurements without being limited by small target aperture size.

The mount assembly is advantageously adapted for use with commercially available laser equipment, such as a Hamar laser source with a Hamar target or a Permalign laser/monitor with cooperating prism. One component of the laser equipment is attached to a mount assembly on one of the coupled machines and the other component is attached to a substantially identical mount assembly on the other machine. Thus, two mount assemblies forming one set are utilized with the laser alignment equipment. While the commercially available laser equipment (such as the Hamar and Permalign equipment) is known in the art to provide alignment data, its use with the improved mount assembly greatly enhances its beneficial function.

With reference to one mount assembly of the set, it is mounted to the bearing housing of one of the coupled machines to be aligned. The assembly includes a mounting bracket to attach directly to the bearing housing. The mounting bracket includes two columns of spaced holes or slots to accommodate the remaining mount components.

A first mounting disk is attached to the mounting bracket with a plurality of bolt/nut assemblies. The first mounting disk has concentrically curved slots for receiving the bolts. The slots are located in equally spaced quadrantal relationship on the first mounting disk. The slots allow limited rotational positioning of the first mounting disk on the bracket; the rotational adjustment movement being limited to the distance that each bolt travels within its respective slot.

A second mounting disk is positioned adjacent the first mounting disk in the assembly. The mounting disks are coupled together with the use of four tilt-adjusting screws. The first mounting disk has threaded apertures located at four quadrantal positions for receiving the tilt-adjusting screws. The screws are recessed in four cooperating passages in the second mounting disk. The recess passages have sufficient space to allow the technician sufficient clearance to manipulate the tilt-adjusting screws within the second mounting disk, using a pre-set torque-limiting wrench.

Actuation of the tilt-adjusting screws and relative tilting of the disks generates one of the key adjustment features provided by the inventive mount assembly. More specifically, the mounting disks have cooperating cone-shaped recesses for a pivot ball that is positioned between and engages the disks. The recesses and thus the pivot ball are specifically positioned on the center axis of the disks, thus forming the center fulcrum for infinitely variable or universal horizontal and vertical tilt. Selective manipulation of the tilt-adjusting screws causes the second mounting disk to pivot about the pivot ball, allowing operational universal tilt adjustment for the laser alignment equipment.

A cylindrical insert is coaxially attached to the second mounting disk. The cylindrical insert includes an annular groove at a proximal end for receiving one or more set screws to secure it. The insert also includes a second groove at a distal end to receive a retainer ring for a purpose to be described below. The end face on the distal end of the insert includes a plurality of bores for receiving supporting dowel pins and additional threaded holes for receiving fastening screws. The pins and fastening screws are utilized in attaching and firmly securing the end cap to the cylindrical insert.

In addition, for assembly convenience and when space considerations allow, a threaded end ring is used with a cooperating threaded collar to attach the end cap to the insert. The collar is held to the insert by engagement with a retainer ring in the second groove. The laser equipment is in turn secured to the end cap.

The easily removable attachment of the end cap with respect to the insert provides an advantageous plug-in/plug-out feature for the mount assembly. After the laser equipment is initially zeroed, the end caps with their respective sensitive laser system components are removed during the extended time of the thermal cycle. When the thermal cycle is completed, the end caps with equipment components are reinstalled for determination of the thermal growth data. The dowel pins assist in assuring that the reinstalled end cap and attached components are accurately positioned.

In an important aspect of the invention, the bores for the dowel pins and holes for the set screws in the end cap are positioned to allow it to be rotated by intervals of 90°. This is particularly advantageous with the use of Permalign laser equipment allowing greater measuring capability at one fixed mount location. More specifically, the Permalign laser equipment generally provides two of the four desired measurement axes (i.e. vertical angular and horizontal parallel) from one location on the coupled machines. Normally, another set of Permalign equipment mounted at a position displaced 90° from the first set of equipment is needed to obtain the other two sets of measurement axes (i.e. horizontal angular and vertical parallel). However, the inventive mount assembly and method allows one set of Permalign laser equipment to be simply rotated 90°; that is rotating the attached end cap 90° to allow the entire set of measurements (vertical and horizontal, angular and parallel) to be taken at one mount location. It can be appreciated that with this feature, the cost of another set of laser alignment equipment is avoided when all measurements are taken in a single thermal cycle.

In accordance with a further aspect of the present invention, the mounting disks are provided with cooperating tooling balls. Each disk has four, radially projecting tooling balls, each tooling ball positioned at one of four quadrantal positions. Thus, the mounting disks provide four cooperating pairs of tooling balls, each pair positioned 90° from the next adjacent pair, all on the same constant diameter. Preferably, two pairs are positioned at top center and bottom center, respectively, of the disks and the other two are positioned equidistantly between the first two pairs, along the horizontal center plane of the disks. This positioning allows the tooling balls to provide precise measurement of the change in angular and parallel adjustment, both vertically and horizontally, of the laser equipment during zeroing using an accurate and sensitive outside micrometer.

More specifically, the laser equipment is initially zeroed prior to the thermal cycle, and then re-zeroed following the thermal cycle. Thus, the repeatability of the laser equipment is utilized. It can be appreciated that thermal growth of the coupled shafts requires tilt adjustment of the assembly during the re-zeroing procedure. This results in a relative gap difference between cooperating tooling balls when comparing the zeroed pre-cycle assembly orientation to the re-zeroed post-cycle assembly orientation. The changes in the gaps between the pairs of tooling balls are precisely measured by an outside micrometer, determining with precise accuracy the required re-zeroing adjustment. These data are then used to determine alignment and offset considerations. It can thus be seen that the poor linearity of the laser equipment as it diverges from the zero reference point does not substantially enter into the alignment calculations. The efficient re-zeroing capability improves the accuracy of the laser alignment equipment, taking advantage of the repeatability of the equipment while not allowing the linearity problems to emerge.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
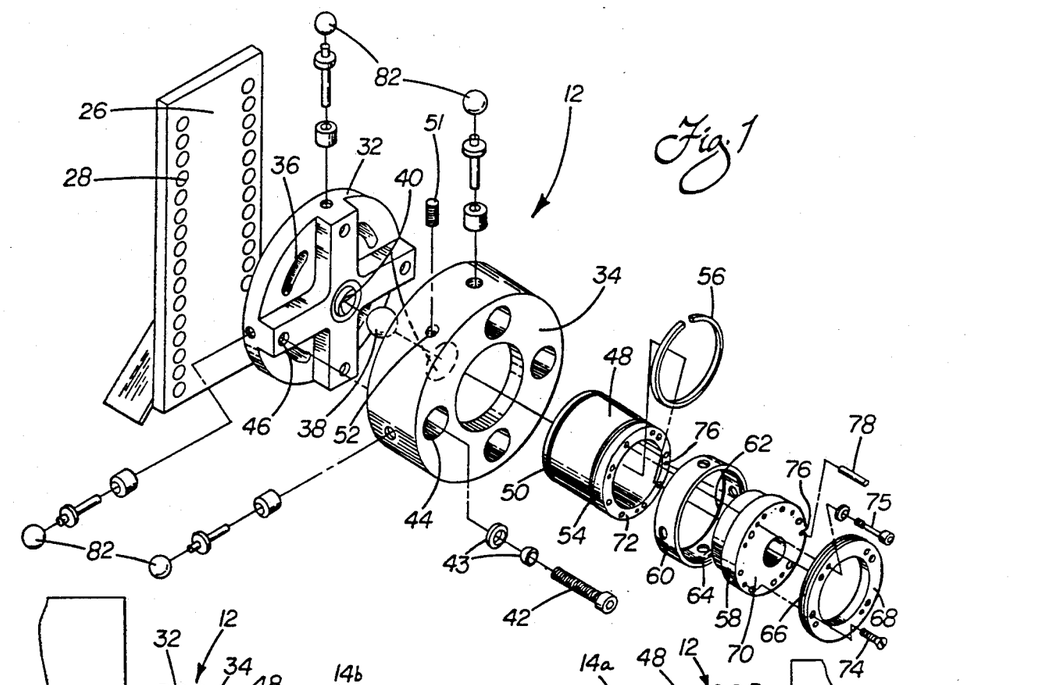
FIG. 1 is an exploded view of the mount assembly of the present invention showing the interrelationship of the individual components.

Reference is made to FIG. 1 illustrating the individual components that comprise the inventive mount assembly 12. The assembly 12 is used to mount commercially available laser alignment equipment, generally identified as 14a, 14b (FIG. 2) to be utilized in facilitating the growth-compensated alignment of coupled shafts 18. As will be appreciated from a review of the following description in conjunction with the drawings of the preferred embodiment, the mount assembly 12 provides a cost efficient way to gather alignment data on a wide variety of machines in an industrial facility. The mount assembly 12 also allows extended measurement range for the laser equipment 14, and often greatly improves the accuracy of the alignment growth data obtained.

Figure 2:
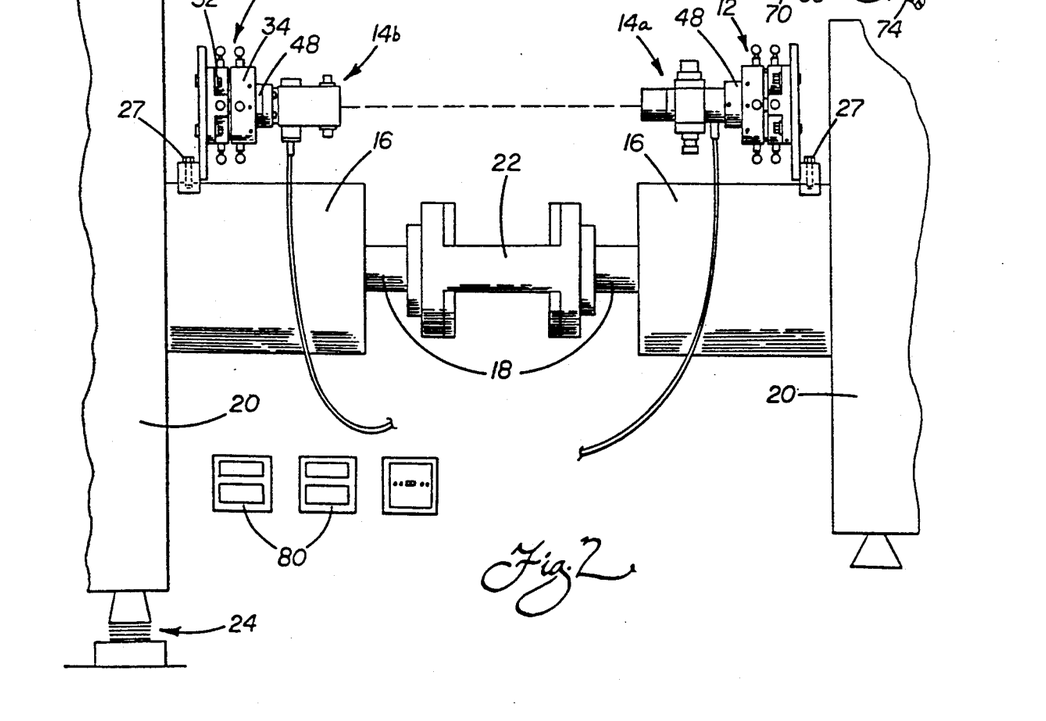
FIG. 2 is a side elevational view of two machines having coupled shafts, with a set of mount assemblies including their respective laser alignment equipment components mounted on the bearing housings.

As particularly shown in FIG. 2, the laser alignment equipment 14a, 14b requires a set of two mount assemblies 12. One mount assembly 12 mounts one component of the equipment, i.e. laser source 14a, and another mount assembly 12 mounts the other component, i.e. laser target 14b. The mount assembly 12 may be utilized with such laser equipment as Hamar T-261 4-Axis Simultaneous Target or Hamar T-212 4-Axis Manual Conversion Target, with cooperating Hamar L-815 Laser Source. This equipment allows the user to obtain alignment data for all four measurement axes (vertical and horizontal, angular and parallel) from a single mounting location. Another set of laser equipment that may be utilized with the inventive mount assembly 12 is the Permalign ALI 3.201 Laser/Monitor with cooperating roof prism. This equipment normally allows measurement data for only two of the four measurement axes from one mounting location, thus suggesting the necessity to use a second set of Permalign equipment to obtain data for the other two axes, if data must be obtained in a single thermal cycle. However, as will be described below, the mount assembly 12 allows the Permalign equipment to be utilized at one mounting location to obtain the entire set of desired measurements.

Each one of the set of mounting assemblies 12 is preferably mounted to a bearing housing 16 of the corresponding machine shaft 18. The shafts 18 of adjacent machines 20 are coupled by any commonly known flexible coupling 22. The results of relative growth measurements obtained using the mount assemblies 12 and attached laser alignment equipment 14 in combination with basic cold shaft alignment measurements obtained separately by means well known to those versed in the art, advantageously allow the machines 20 to be properly positioned relative to each other to provide stable, hot running alignment between the coupled shafts 18.

The actual vertical relative shifting of the machines can be accomplished, for example, with the use of shims 24, as shown supporting one foot of the left machine 20 in FIG. 2. Horizontal movements are made simply by appropriately shifting the machines.

The mounting assemblies 12 supporting both the laser source 14a and laser target 14b are substantially identical, which minimizes the manufacturing costs. In the discussion below, reference is made to the components of only one mount assembly 12 to simplify the description.

A mounting bracket 26 is securely attached to the bearing housing 16. It can be appreciated that different machines 20 have different surface contours, and accordingly the base of the brackets 26 may be individually fabricated for attachment to a particular machine 20, using capscrews 27 threaded into shallow holes. However, the bracket 26 with the inverted V-shaped base, as shown (see FIG. 2), provides an acceptable universal mounting for cylindrical housings.

The bracket 26 with other mount components is shown in FIG. 2 as mounted to the top of the bearing housing 16. However, the preferred mount location is at or near the horizontal split line of the housing 16. This is due to the generally greater degree of accessibility of the sides of the housing 16. Cooperating sets of laser equipment 14a, 14b mounted in similar assemblies 12 on the opposite side of the housings 16 and along the top center can allow averaging for more accurate results.

The mounting bracket 26 is provided with two columns of cooperating holes or slots 28 to allow radial adjustability for the laser alignment equipment. Four holes 28, two from each column, form a set, each different set being positioned step-wise radially out from the bearing housing 16. The holes 28 receive a bolt/nut assembly 30 that acts to secure a first mounting disk 32 to the mounting bracket 26 (see FIG. 3). A second mounting disk 34 is operationally positioned adjacent the first mounting disk 32 to provide an important feature of the unique adjustment capability with the mount assembly 12, and the related method, as will be more completely described below.

Each bolt/nut assembly 30 passes through a concentrically curved slot 36 of the mounting disk 32. In the preferred embodiment, there are four slots 36, each symmetrically positioned in one of four quadrants on the disk 32. It can be appreciated that the slots 36 allow the disk 32 to be rotated to some degree about its central axis. This likewise allows the laser alignment equipment 14a, 14b to be rotated to the same extent through its indirect attachment to the first mounting disk 32. However, once the bolts are tightened, the first mounting disk 32 is substantially secured against movement.

Figure 3:
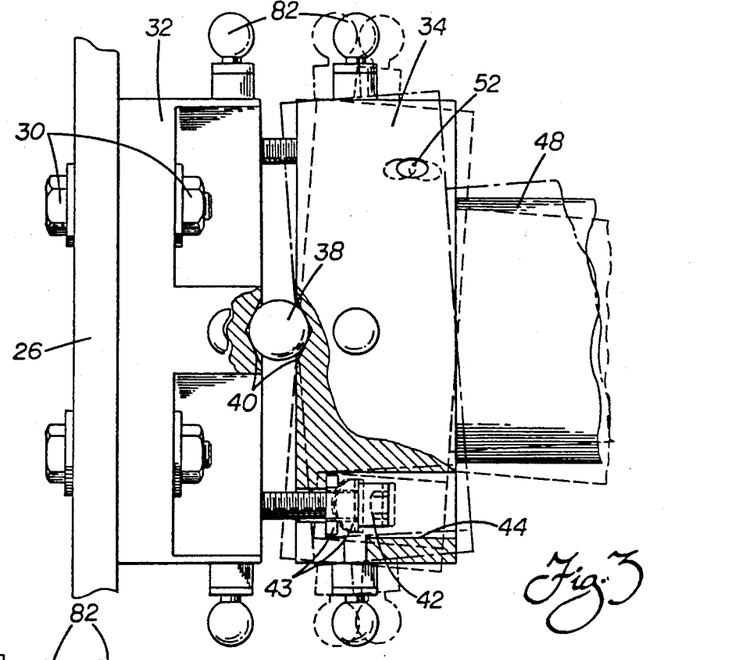
FIG. 3 is a side elevational view of the mount assembly of the present invention with a portion of the second mounting disk broken away showing the adjustment capability of the tilt-adjusting screws and the resulting tilt effect of the disk.

In an important aspect of the invention, a universal pivot ball 38 is received in cone-shaped recesses 40 in the disks 32, 34 and maintains the disks 32, 34 in spaced relationship. The ball 38 is glued to the cone-shaped recess 40 in the disk 32 and lubricant is applied between the ball 38 and the cone-shaped recess 40 in the disk 34. As shown in FIG. 3, the pivot ball 38 allows the second mounting disk 34 to be adjustably positioned through its pivotable capability about the ball 38. The pivot ball 38 allows the beneficial universal, angular and parallel adjustment, that is both vertically and horizontally, of the mount assembly 12 for the initial zeroing, and re-zeroing procedures, as will be described below.

The pivoting of the second mounting disk 34 about the pivot ball 38 is controlled by a plurality of tilt-adjusting screws 42. The screws 42 are recessed in cooperating passages 44 in the second mounting disk 34, and are threadably received in threaded apertures 46 in the first mounting disk 32. The threads in these apertures utilize mechanical spring or chemical adhesive means to secure against vibration-induced loosening of the screws 42. In the preferred embodiment, there are four tilt-adjusting screws 42, each screw 42 being quadrantally positioned. Two screws 42 are at top center and bottom center, respectively, and the other screws 42 are halfway between, or at 90° thereto. The passages 44 have sufficient clearance so that the appropriate controlled torque actuating tool may be easily inserted and relative tilting action is accommodated.

It can be visualized that by selectively and incrementally tightening and loosening the generally diametrically opposed tilt-adjusting screws 42, the second mounting disk 34 is caused to pivot to provide infinite, universal adjustment within the range of movement about the pivot ball 38. The pivoting motion is shown in FIG. 3 in two-dimensional form for illustrative purposes. The cooperating spherical seat cup/flat washers 43 (see FIGS. 1 and 3) provide even seating and sufficient interaction rigidity to keep the mounting disk 34 in a snug, adjusted position at all times. This feature, plus the use of a controlled torque wrench for tightening, avoids inadvertent looseness from occurring as individual screws 42 are turned for adjustment. Thus, it can be appreciated that selective and sequential manipulation of the tilt-adjusting screws 42, allow the disk 34 to pivot and tilt providing the universal adjustment desired.

A cylindrical insert 48 is coaxially received within the second mounting disk 34. The insert 48 provides direct support for the laser alignment equipment 14. The insert 48 includes an annular groove 50 at a proximal end for receiving one or more set screws 51. This secures the insert 48 within the mounting disk 34. The set screws 51 are mounted in quadrantally spaced tapped holes 52 in the mounting disk 34.

The insert 48 also includes an outer annular groove 54 at a distal end for receiving a spring-metal retainer ring 56. The retainer ring 56 secures an end cap 58 to the insert 48. More specifically, a retaining collar 60 slips over the insert 48. Since the retainer ring 56 is spring-loaded, it is spread to allow it to seat in the groove 54. The collar 60 has an annular flange 62 that engages the ring 56 when pulled back towards the end cap 58.

The distal end of the collar 60 is internally threaded at 64 for mating with a threaded outer surface 66 of an end ring 68. The end ring 68 fits against and is secured to the face 70 of the end cap 58. The retaining collar 60 is threaded onto the end ring 68, forcing the end cap 58 and the insert 48 into tight, secure engagement.

Flathead slotted screws 74 attach the end ring 68 to the end cap 58. Socket head screws 75 with reduced shanks secure the end cap/end ring assembly to the cylindrical insert 48. The socket head screws 75 alone provide sufficient security for the attachment of the end cap 58 and the insert 48 and thus when space is constricted, there is no need to utilize the retaining collar 60 and the end ring 68. It can be appreciated that, regardless of the specific choice of insert 48/end cap 58 attachment, the end cap 58 is easily and efficiently removable from the insert 48. The laser equipment 14a, 14b remains secured to the end cap 58 by other screw fasteners during the entire measurement operation.

In an important aspect of the invention, the insert 48 and the end cap 58 also have aligned bores 76 for receiving dowel pins 78. The dowel pins 78 are permanently press-fitted into end cap 58 and slide closely into and out of bores 76 in insert 48, to ensure precise positioning between the end cap 58, the insert 48 and thus the laser equipment 14a, 14b also.

The dowel pins 78 assist in the advantageous precisely repeatable plug-in/plug-out feature provided by the mount assembly 12. More particularly, to avoid potential damage to the delicate laser equipment 14 during the thermal cycle, the end cap 58 with attached laser equipment is removed from the assembly 12 following the initial zeroing. After the thermal cycle is completed, the end cap 58 with attached equipment 14a, 14b is reinstalled to obtain the data related to the relative change in position of the coupled shafts over the thermal cycle. Ideally, the thermal cycle chosen for study is the hot-to-cold running cycle. Thus, the required offsets resulting from the alignment data obtained can be applied prior to resumption of machine operation. The mount assembly 12 can be attached to the running machine 20 in preparation for measuring the hot-to-cold running cycle.

It can be appreciated that the mount assembly 12 substantially reduces the possibility of operational damage to the laser equipment 14a, 14b. The equipment is on the machine 20 for a minimum period of time, during which it is being used, and thus closely protected. Any need to guard the equipment 14 while on the machine 20 is obviated, eliminating the associated costs. The plug-in/plug-out feature also allows one set of laser equipment 14a, 14b to measure thermal growth on a plurality of machines during one shut-down cycle. Thus, the substantial cost associated with multiple sets of laser equipment may be avoided.

The inventive mount assembly 12 further allows the technician to check the laser equipment 14a, 14b for reduced operational effectiveness. More specifically, a test stand with an attached set of mount assemblies 12 may be utilized to provide a zero reference point relating to the operation. If the technician suspects damage or deviation from normal calibration, he can place the equipment on the mount assemblies 12 on the test stand and check for correspondence with the original zero reference point.

The specific positioning of the aligned dowel pins 78 and their mating bores 76 defines the minor distinction between the two mount assemblies 12 in one set. Remembering that one mount assembly 12 mounts the laser source 14a and the other mount assembly 12 mounts the laser target 14b, the positioning of the bores 76 are slightly different. Thus, the insert 48/end cap 58 assembly of one mount assembly 12 is specifically identified to hold either the laser source 14a or the laser target 14b. This substantially eliminates the inadvertent cross substitution of the source 14a and the target 14b when reinstalling them following the thermal cycle.

In normal use, an initial zero reference point is created by bringing the laser beam axis into correspondence with the target axis to generate a zero reading for all measurement axes shown on the equipment's readout displays, generally shown as 80 in FIG. 2. This step is called the initial zeroing of the equipment, and is accomplished prior to the beginning of the thermal cycle. The equipment 14 is then either continuously or intermittently monitored during the thermal cycle or turned off until the end of the thermal cycle. Once the thermal cycle is complete, the thermal growth is measured using the difference from the zero reference point as indicated in the display 80. However, due to undesirable linearity characteristics, the accuracy of the difference as the beam axis moves farther away from the target axis is decreased.

In order to avoid this potential linearity problem, the set of inventive mount assemblies 12 allows the laser alignment equipment 14a, 14b to be utilized in a much more beneficial manner. More specifically, the equipment is initially zeroed as is customarily done. However, at the end of the thermal cycle rather than relying on the relatively inaccurate growth data as determined by the difference in laser display readouts, adjustments are made to the mount assemblies 12 to re-zero. Independent measurements are then made to determine the adjustment required during re-zeroing procedure and thermal movement is determined with reference to these measurements. Accordingly, the alignment data obtained using the inventive mount assembly 12 relies upon the superior re-zeroing repeatability of the laser equipment 14 while being independent of its less reliable linearity characteristics.

In a very important aspect of the invention, tooling balls 82 are utilized to independently provide accurate and precise measurements of the re-zeroing adjustments. The tooling balls 82 are attached to the mounting disks 32, 34. Each disk 32, 34 has four tooling balls 82 attached thereto at one of four quadrantal positions. Accordingly, four pairs of tooling balls 82 are provided for each mount assembly 12. Preferably, one pair or set is positioned at top center, one pair at bottom center, and the other two pairs at the 90° side positions. The distance x between the tooling balls 82 in a pair (see FIG. 4) defines an important gap that is used in the calculation of thermal movement. It can be appreciated that the tilt adjustments made to the second mounting disk 34 alters the gap between the outside surfaces of the tooling balls 82. This is measured following the re-zeroing procedure and compared to the gap distance as measured following the initial zeroing procedure. The relative difference provides a determination of the tilt adjustment required to re-zero the laser equipment 14 and is thus used along with necessary constant geometric measurements to provide a measurable indication of thermal growth.

Figures 4, 5:
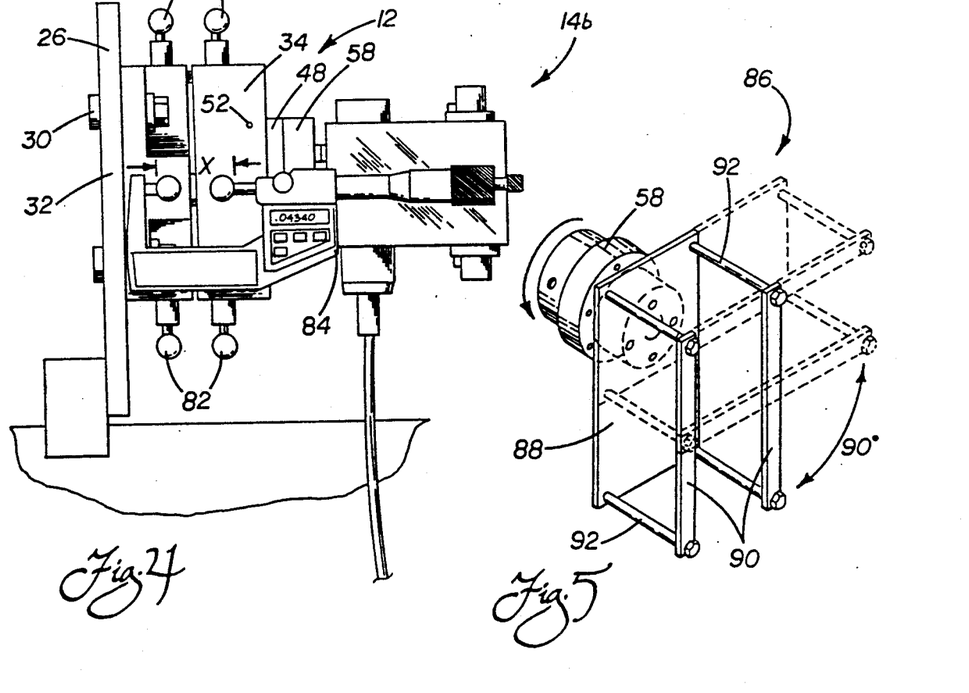
FIG. 4 is a side elevational view of the mount assembly of the present invention showing the operation of the outside micrometer as it measures the gap between cooperating tooling balls following either the initial zeroing or the re-zeroing procedure.
FIG. 5 is a perspective view of an adapter utilized with the mount assembly of the present invention for mounting Permalign laser alignment equipment.

An outside micrometer 84 is utilized to measure the gap, as shown in FIG. 4. The micrometer 84 provides precise gap distance and thus highly accurate data to determine thermal growth. Although any outside micrometer 84 of suitable range may be used, the preferred type is an electronic digital micrometer with remote readout or "hold" feature, and concave or conical recessed anvil and spindle end adapters which conform to the tooling ball surfaces and thus enhance quick, consistent readings. Thus, the re-zeroing capability advantageously assisted by the use of tooling balls 82 takes advantage of the inherent repeatability of laser alignment equipment 14, while not depending on its less than ideal linearity.

When Permalign laser equipment is utilized with the mount assembly 12, an additional component is provided to allow the equipment to provide the entire set of desired measurements from one mounting location. A Permalign mounting adapter 86 is shown in FIG. 5. The adapter 86 attaches directly to the end cap 58 and receives the Permalign component. The adapter 86 includes a mounting plate 88 with integral cylindrical projection that engages the end cap 58. A pair of support rods 90 are connected to the mounting plate 88 by connecting bolts 92. The support rods 90 securely engage and are held within grooves formed in the housing of the Permalign component.

The mount assembly 12 has a 90° rotation feature that allows the Permalign equipment to obtain all the required measurement data using one fixed mount location. More particularly, the end cap 58 is capable of rotation and attachment at 90° intervals on the cylindrical insert 48. Thus, once the mounting adapter 86 with its attached Permalign component is fixed to the end cap 58, the end cap 58/adapter 86/ Permalign component may be rotated 90°, as shown in FIG. 5. Accordingly, a single Permalign system may be utilized to obtain four important measurements for the four important measurement axes without the need of moving the entire mount assembly 12 to another position on the bearing housing 16.

The method of use of the inventive mount assembly 12 with the laser equipment in determining shaft alignment characteristics will now be described. Prior to operation, the set of mount assemblies 12 are attached to cooperating bearing housings 16 on adjacent machines 20 (see FIG. 2). Since the ideal thermal cycle for obtaining growth measurements is the hot-to-cold running cycle, the mount assemblies 12 may be attached to the bearing housings 16 while the machines 20 are in running (hot) operation. The mount assemblies 12 may actually be secured for permanent attachment on the machines. While one mount location of laser equipment 14a, 14b may be utilized to gather all the required growth data, the accuracy of the readings may be increased in some cases by taking measurements from opposite horizontal sides of the bearing housings 16 and averaging.

Prior to the beginning of the thermal cycle, the laser equipment 14a, 14b is attached in operable position to the respective end caps 58. The assembly 12 is adjusted to bring the laser beam axis in coincidence with the target axis, thus establishing an initial zero reference point. The zeroing procedure involves incremental adjustments to the tilt-adjusting screws 42 to incrementally pivot the second mounting disk 34 about the pivot ball 38. More particularly, the mount assembly 12 holding laser source 14a is adjusted for parallel readings; this adjustment having a less pronounced effect on the angular component. When the first parallel zero adjustment is completed, the mount assembly 12 holding the target component 14b is adjusted for angular readings; this adjustment having a less pronounced effect on the parallel component. It can be appreciated that there is a small amount of cross effect, i.e. adjusting one mount assembly 12 for one component slightly alters the other component. However, the cross effect is minimized by concentrating the adjustment for each component on the appropriate mount assembly 12, as just described, and then going back and making successively smaller trim adjustments to achieve the desired zeroing.

Once the initial zeroing procedure is completed, gap dimensions between cooperating tooling balls 82 are measured and recorded. The alignment equipment is now ready for the thermal cycle to proceed. Advantageously, the end caps 58 holding the laser equipment 14 are removed during the thermal cycle to prevent inadvertent damage or obviate the need for constant oversight during the period, which could last hours, or even days. The specific positioning of the dowel pins 78 allow the end cap 58/laser equipment to be remated following the end of the thermal cycle without significant loss of accuracy.

The relative position of the coupled shafts changes during the thermal cycle. This thermal growth diverts the laser beam axis from substantial coincidence with the target axis. This positional change is readily indicated by the movement off the zero reference point, as shown in the readout displays 80.

In cases of extreme thermal growth, the laser beam moves completely out of the target area and the display is lost. Additionally, it can be appreciated that even a relative smaller amount of growth can cause this situation if the laser source 14a is required to be positioned a great distance from the laser target 14b.

However, the inventive mount assembly 12 allows the laser equipment 14a, 14b to recapture a lost display, and thus provides a viable alternative. More specifically, a beam finder can be used to locate the beam and allow the appropriate adjustment to ensure that it re-enters the aperture of the target to recapture the display. Since the adjustment required is measured by the gap distance x between cooperating tooling balls 82, it does not matter how much adjustment is required to recapture the display, provided such adjustment is within the relatively large adjustment range of the assembly 12.

Following the end of the thermal cycle, the laser equipment 14 is re-zeroed using the same procedure as described above for the initial zeroing. It can be appreciated that the incremental adjustments required to re-zero the laser equipment 14 alters the gap distance between cooperating tooling balls 82. Consequently, following the re-zeroing procedure, the micrometer 84 is used to measure the new distance x between tooling balls 82. The change in gap distance for each pair of tooling balls 82 from the initial represents the adjustment magnitude at that location required to bring the coupled shafts back into original alignment. Accordingly, mathematical calculations are used along with geometry considerations to incorporate the data obtained; that is, the two readings of each gap x from the micrometer 84. Once this is determined, the machines 20 may be offset by the appropriate amount to allow the coupled shafts to grow into alignment when in hot running operation.

Figure 6A:
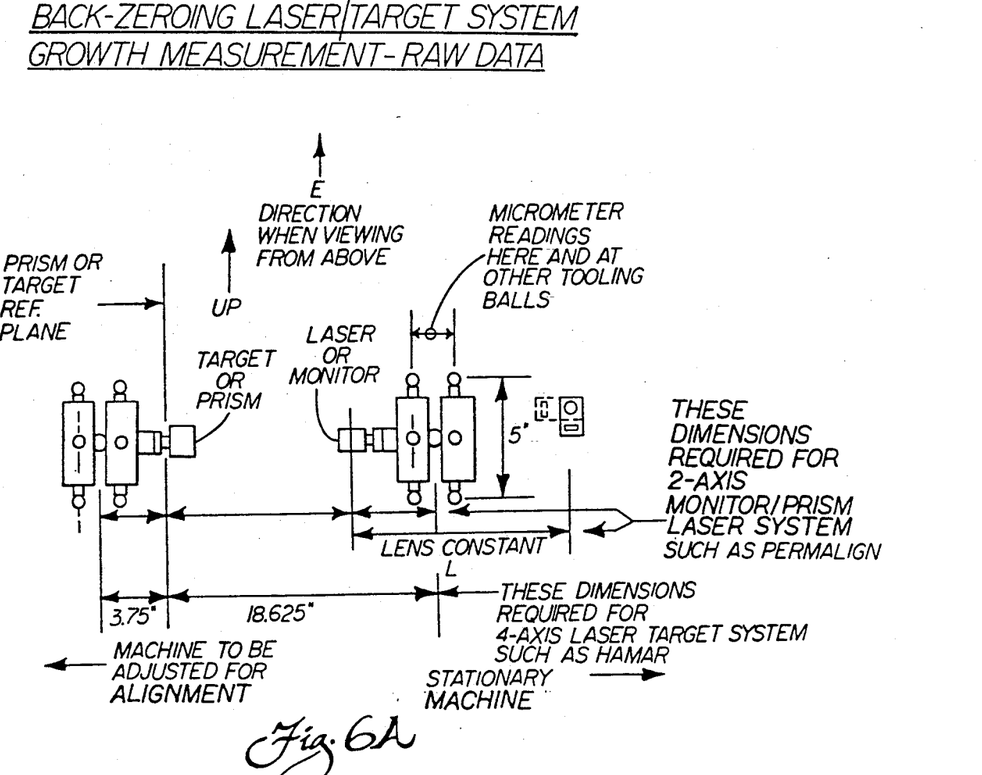
FIG. 6A is a diagrammatic view of the laser alignment mount assembly in operative relation, including the specific dimensions applicable to thermal growth data and calculations reported in tabular form below.
Figure 6B:
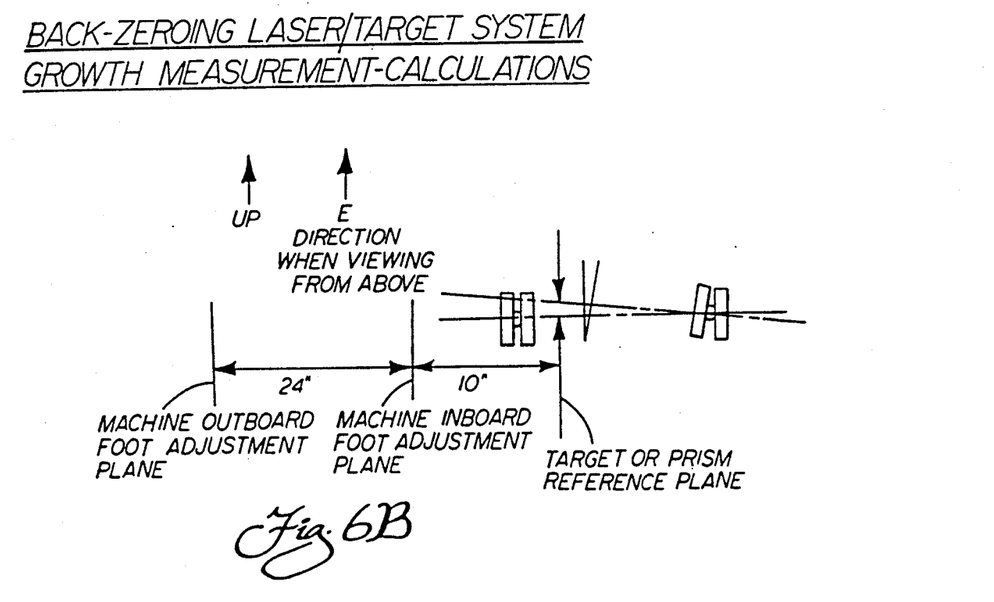
FIG. 6B is a diagrammatic view of laser source and target axes following a thermal cycle, including further dimensions applicable to thermal growth data and calculations reported in tabular form below.

With reference to FIGS. 6A and 6B, the following example set of data with calculations is presented to further illustrate the invention.

LASER: Hamar L-815 Target: Hamar T-212
MICROMETER: Mitutoyo 293-702 Modified

| | LASER TARGET OR MONITOR READINGS | | | | |
|---|---|---|---|---|---|
| READING NUMBER | ANGULAR VERTICAL IN./IN. | ANGULAR HORIZONTAL IN./IN. | PARALLEL VERTICAL IN. | PARALLEL HORIZONTAL IN. | REMARKS: (Hot, Cold, Heating, Cooling, Initial or Final Zero, Thermal Move in Progress or Complete, Ambient Temp) |
| 1 | +.0014 | +.0009 | +.0028 | +.0013 | Hot running. Initial Zero. |
| 2 | −.0070 | −.0050 | −.0726 | +.1112 | Cold shutdown. Thermal move complete. |
| 3 | −.0006 | +.0008 | +.0012 | −.0012 | Cold shutdown. Re-zeroed. Ambient Temperature +65 to 75 degrees F. |

| | MICROMETER READINGS - IN. TO RIGHT OF DECIMAL POINT | | | | | | | | |
|---|---|---|---|---|---|---|---|---|---|
| READING NUMBER | TARGET | | | | LASER | | | | REMARKS |
| | TOP | BOTTOM | E. SIDE | W. SIDE | TOP | BOTTOM | E. SIDE | W. SIDE | |
| 1 | .35845 | .32630 | .29670 | .38825 | .36360 | .32665 | .37130 | .31805 | Averages |
| 3 | .36490 | .31930 | .32090 | .36360 | .37570 | .31390 | .35695 | .33185 | " |

| | LASER DIRECT | | | | |
|---|---|---|---|---|---|
| | ANGULAR VERTICAL IN./IN. | ANGULAR HORIZONTAL IN./IN. | PARALLEL VERTICAL IN. | PARALLEL HORIZONTAL IN. | REMARKS: (Include whether hot or cold) |
| INITIAL ZERO | +.0014 | +.0009 | +.0028 | +.0013 | HOT |
| AFTER MOVE | −.0070 | −.0050 | −.0726 | +.1112 | COLD |
| DIFFERENCE | .0084T | .0059E | .0754L | .1099E | HOT TO COLD |
| (Note where wider: T, B, N, S, E, W, and if target or prism moved higher (H) or lower (L) and N, S, E, or W.) | | | | | |
| REZERO | −.0006 | +.0008 | +.0012 | −.0012 | COLD |
| DIFFERENCE from initial zero | .0020 | .0001 | .0016 | .0025 | |

| | MICROMETER | | | | | | |
|---|---|---|---|---|---|---|---|
| | ANGULAR VERTICAL - IN./IN. | | | | ANGULAR HORIZONTAL - IN./IN. | | |
| | TARGET | | LASER | | TARGET | | LASER |
| Re-zero after | .36490 − .35845 = | .00645 | .37570 − .36360 = | .01210 | .32090 − .29670 = | .02420 | .37130 − .35695 = .01435 |
| thermal move | .32630 − .31930 = | .00700 | .32665 − .31390 = | .01275 | .38825 − .36360 = | .02465 | .33185 − .31805 = .01380 |
| with direction | Wider at top | .01345 | Wider at top | .02485 | Wider at east | .04885 | Wider at west .02815 |

| | | |
|---|---|---|
| recorded in reverse | $\frac{.01345 + .02485}{5} + .0020 = .0097$ in./in. wider at top, hot to cold | $\frac{.04885 - .02815}{5} + .0001 = .0042$ in./in. wider at east, hot or cold |
| | PARALLEL VERTICAL AT TARGET PLANE - IN. | PARALLEL HORIZONTAL AT TARGET PLANE - IN. |
| Re-zero after thermal move with direction recorded in reverse | $\uparrow .01345 \left(\frac{3.75}{5}\right) - \downarrow .02485 \left(\frac{18.625}{5}\right) - .0016 =$ .0841 in. Target dropped, hot to cold | $E.04885 \left(\frac{3.75}{5}\right) + E.02815 \left(\frac{18.625}{5}\right) - .0025 =$ .1390 in. Target went east, hot to cold |

| | ANGULAR VERTICAL | ANGULAR HORIZONTAL | PARALLEL VERTICAL | PARALLEL HORIZONTAL |
|---|---|---|---|---|
| Laser direct results. Absolute and % error based on re-zero | .0097 − .0084 = .0013 in./in. $\frac{.0013}{.0097} = 13.4\%$ less by laser | .0059 − .0042 = .0017 in./in. $\frac{.0017}{.0042} = 40.5\%$ more by laser | .0841 − .0754 = .0087 in. $\frac{.0087}{.0841} = 10.3\%$ less by laser | .1390 − .1099 = .0291 in. $\frac{.0291}{.1390} = 20.9\%$ less by laser |

GROWTH & OFFSETS AT MACHINE FEET, BASED ON RE-ZERO MICROMETER RESULTS
VERTICAL
IB: ↓ .0097(10) + ↓ .0841 = .1811 in. lower, hot to cold, so set inboard feet 0.181 in. low.
OB: ↓ .0097(10 + 24) + ↓ .0841 = .4139 in. lower, hot to cold, so set outboard feet 0.414 in. low.
HORIZONTAL
IB: W.0042(10) − E.1390 = .097 in. east, hot to cold, so set inboard feet 0.097 in. east.
OB: W.0042(10 + 24) − E.1390 = .0038 in. west, hot to cold, so set outboard feet 0.004 in. west.
NOTE: "HOT" REFERS TO STABLE OPERATING TEMPERATURE. "COLD" REFERS TO STABLE SHUTDOWN TEMPERATURE. ON A FEW MACHINES, BY THESE DEFINITIONS, "HOT" WILL BE LOWER TEMPERATURE THAN "COLD".
HAMAR FOUR-AXIS LASER/TARGET - TARGET ON LEFT
ANGULAR: (−) MEANS WIDE AT TOP OR FAR SIDE
(+) MEANS WIDE AT BOTTOM OR NEAR SIDE
PARALLEL: (−) MEANS TARGET IS LOW OR CLOSER
(+) MEANS TARGET IS HIGH OR FARTHER AWAY In summary, numerous benefits are obtained by the use of the present invention. The mount assembly 12 permits many machines to be measured for thermal movement in a single time frame, using only one set of laser alignment equipment. Damage to laser equipment is avoided by being able to remove it when measurements are not being taken. Accuracy is greatly improved by the re-zeroing capability provided by the pivotal adjustment generated by the tilt-adjusting screws 42 to pivot the second mounting disk 34 about the pivot ball 38. This also allows the laser readout display 80 to be recaptured in cases of extreme relative growth during the thermal cycle. The accuracy of the alignment data is assisted by the precise measurements associated with the relative gap distance between tooling balls 82 as measured by the outside micrometer 84. The re-zeroing capability also substantially increases the measurable range. The design further lends itself to use with a test stand permitting the laser equipment to be tested at any time for damage or deterioration.

The foregoing description of a preferred embodiment of the invention has been presented for purposes of illustration or description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An assembly for providing alignment thermal growth measurements for coupled shafts, said assembly located on adjacent machines, comprising:
    laser measuring means;
    bracket means associated with each of said coupled shafts; and
    universal means for attaching said laser means to said bracket means for single-point pivotal movement so as to allow adjustment of said laser means in a plurality of directions;
    whereby alignment accuracy and measurement range 2. An assembly for providing alignment thermal growth measurements for coupled shafts, said assembly located on adjacent machines, comprising:
    laser measuring means;
    bracket means associated with each of said coupled shafts; and
    universal means for pivotally attaching said laser measuring means to said bracket means so as to allow adjustment of said laser means in a plurality of directions,
    said pivotal attaching means including first mounting means attached to said bracket means, said first mounting means providing said pivotal adjustment, and second mounting means attached to said first mounting means for receiving said laser measuring means;
    whereby alignment accuracy and measurement range are increased.

3. The assembly set forth in claim 2, wherein said bracket means includes means to attach said first mounting means thereon in any one of a plurality of radial positions.

4. The assembly set forth in claim 3, wherein each of said coupled shafts includes a cooperating bearing housing and said bracket means includes means for attaching said bracket means to said bearing housing.

5. The assembly set forth in claim 2, wherein said first mounting means includes a first mounting disk secured to said bracket means, said second mounting means including a second mounting disk universally pivotally attached to said first mounting disk and an insert member attached to said second mounting disk.

6. The assembly set forth in claim 5, wherein said first mounting disk includes a plurality of slots for receiving attachment bolts, said slots allowing rotational adjustment of said first mounting disk.

7. The assembly set forth in claim 6, wherein said universal pivotal attachment between said first and second mounting disks includes a pivot ball received within cooperating recesses in said mounting disks and a plurality of tilt-adjusting screws coupling said disks.

8. The assembly set forth in claim 7, wherein there are four tilt-adjusting screws, each located at a quadrantal position.

9. The assembly set forth in claim 8, wherein said mounting disks each have at least one tooling ball cooperating to form a pair.

10. The assembly set forth in claim 9, wherein there are four pairs of cooperating tooling balls, each pair at one of four equally spaced quadrantal positions.

11. The assembly set forth in claim 10, further including micrometer measuring means for measuring gap dimension between said tooling balls to measurements.

12. The assembly set forth in claim 11, wherein said micrometer means is an outside micrometer.

13. The assembly set forth in claim 2 wherein said second mounting means includes means for rotating said laser measuring means about an axis parallel to said coupled shafts and reattaching the same in another operative 90° rotated position,
whereby to facilitate obtaining measurements for all axes without having the assembly to another location.

14. A method for determining thermal growth of coupled shafts during a thermal cycle using laser alignment equipment mounted to adjacent machines for universal positioning and single point pivotal movement comprising the steps of:
establishing a zero reference point for said laser equipment before beginning said thermal cycle;
determining the position of said mounted laser equipment with independent measurement following said establishment of said zero reference point;
reestablishing said zero reference point for said laser equipment after the end of said thermal cycle;
determining the change in position of said mounted laser equipment with independent measurement following said reestablishment of said zero reference point; and
calculating said thermal growth during said thermal cycle from the change in position.

15. The method of claim 14, further including the step of removing said laser equipment before beginning said thermal cycle and reinstalling said equipment after the end of said thermal cycle.

16. The method of claim 14 further including the step of rotating said laser measuring means about an axis parallel to said coupled shafts prior to calculating the thermal growth, reattaching the measuring means in another operative 90° rotated position,
whereby to facilitate obtaining measurements for all axes without moving the equipment to another location.

17. A method for aligning coupled shafts in response to thermal growth during a thermal cycle measured using laser alignment equipment mounted to adjacent machines for universal positioning and single point pivotal movement, comprising the steps of:
establishing a zero reference point for said laser equipment before beginning said thermal cycle;
determining the position of said mounted laser equipment with independent measurement following said establishment of said zero reference point;
reestablishing said zero reference pint for said laser equipment after the end of said thermal cycle;
determining the change in position of said mounted laser equipment with independent measurement following said reestablishment of said zero reference point;
calculating said thermal growth during said thermal cycle from the change in position;
calculating thermal offsets to be applied at ambient temperature to one or both of said machines; and
adjusting one or both of said machines according to said thermal offsets to bring about substantial alignment of said machines at full operating conditions.

18. The method of claim 17, further including the step of removing said laser equipment before said thermal cycle and reinstalling said equipment after the end of said thermal cycle.

* * * * *

UNITED STATES PATENT AND TRADEMARK OFFICE
CERTIFICATE OF CORRECTION

PATENT NO. : 5,077,905

DATED : January 7, 1992

INVENTOR(S) : Malcom G. Murray, Jr.

It is certified that error appears in the above-identified patent and that said Letters Patent is hereby corrected as shown below:

column 10, line 58, change "positioning" to --positionings--.

Col.16 Claim 1, line 44, following "range", insert --are increased.--

Col. 17 Claim 11, line 32, following "to", insert --provide accurate and precise alignment growth--.

Col.17 In Claim 13, line 42, change "having" to --moving--.

Signed and Sealed this

First Day of June, 1993

Attest:

MICHAEL K. KIRK

*Attesting Officer*        Acting Commissioner of Patents and Trademarks